(12) United States Patent
Watson et al.

(10) Patent No.: US 11,474,929 B2
(45) Date of Patent: Oct. 18, 2022

(54) VIRTUALIZATION OF COMPLEX NETWORKED EMBEDDED SYSTEMS

(71) Applicant: Panasonic Avionics Corporation, Lake Forest, CA (US)

(72) Inventors: Philip Watson, Lake Forest, CA (US); Steven Bates, Mission Viejo, CA (US); Shankar Shastry, Irvine, CA (US); Samir Lad, Dublin, CA (US); Anand Desikan, San Ramon, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 419 days.

(21) Appl. No.: 16/697,053

(22) Filed: Nov. 26, 2019

(65) Prior Publication Data

US 2020/0310947 A1 Oct. 1, 2020

Related U.S. Application Data

(60) Provisional application No. 62/826,839, filed on Mar. 29, 2019.

(51) Int. Cl.
*G06F 11/00* (2006.01)
*G06F 11/36* (2006.01)
(Continued)

(52) U.S. Cl.
CPC ........... *G06F 11/3664* (2013.01); *G06F 8/60* (2013.01); *G06F 9/455* (2013.01); *G06F 9/45558* (2013.01); *G06F 11/261* (2013.01); *G06F 11/3457* (2013.01); *G06F 11/3684* (2013.01); *G06F 11/3688* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS 8,615,384 B2 12/2013 Angus et al.
8,798,972 B2 8/2014 English et al.
(Continued)

OTHER PUBLICATIONS

M. Jones et al., "Scalability of VM provisioning systems," 2016 IEEE High Performance Extreme Computing Conference (HPEC), 2016, pp. 1-5, doi: 10.1109/HPEC.2016.7761629. (Year: 2016).*

*Primary Examiner* — Daniel F. McMahon
(74) *Attorney, Agent, or Firm* — Perkins Coie LLP

(57) ABSTRACT

A testing and verification system for an equivalent physical configuration of an in-flight entertainment and communications system with one or more hardware components includes a virtual machine manager. One or more virtual machines each including a hardware abstraction layer is instantiated by the virtual machine manager according to simulated hardware component definitions corresponding to the equivalent physical configuration of the hardware components. The virtual machines are in communication with each other over virtual network connections. A test interface to the one or more virtual machines generate test inputs to target software applications installed on the virtual machines. A display interface is connected to the virtual machines, with results from the execution of the target software applications responsive to the test inputs are output thereto.

14 Claims, 4 Drawing Sheets

(51) Int. Cl.
    *G06F 9/455*     (2018.01)
    *G06F 8/60*     (2018.01)
    *G06F 11/34*     (2006.01)
    *G06F 11/26*     (2006.01)

(56) References Cited

U.S. PATENT DOCUMENTS

| | | | |
|---|---|---|---|
| 10,320,650 B2* | 6/2019 | Lee | H04L 67/08 |
| 2008/0059556 A1* | 3/2008 | Greenspan | G06F 9/5077 |
| | | | 709/201 |
| 2013/0155083 A1* | 6/2013 | McKenzie | G06F 9/45558 |
| | | | 345/522 |
| 2014/0351810 A1* | 11/2014 | Pratt | G06F 9/45545 |
| | | | 718/1 |
| 2017/0366395 A1* | 12/2017 | Goldfarb | H04L 67/01 |
| 2018/0324227 A1* | 11/2018 | Sharma | H04L 67/08 |
| 2019/0089589 A1* | 3/2019 | Huang | G06F 9/5077 |
| 2019/0213104 A1* | 7/2019 | Qadri | G06F 21/12 |
| 2019/0215200 A1* | 7/2019 | Uberoy | G06F 13/4022 |

* cited by examiner

VIRTUALIZATION OF COMPLEX NETWORKED EMBEDDED SYSTEMS

CROSS-REFERENCE TO RELATED APPLICATIONS

This application relates to and claims the benefit of U.S. Provisional Application No. 62/826,839 filed Mar. 29, 2019 and entitled "VIRTUALIZATION OF COMPLEX NETWORKED EMBEDDED SYSTEMS," the entire disclosure of which is wholly incorporated by reference herein

STATEMENT RE: FEDERALLY SPONSORED RESEARCH/DEVELOPMENT

Not Applicable

BACKGROUND

1. Technical Field

The present disclosure relates generally to networked computer systems for transportation vehicles, and more particularly, to the virtualization of complex networked embedded systems for testing and verification as part of the deployment, update, and maintenance processes.

2. Related Art

Air travel typically involves journeys over extended distances that at the very least take several hours to complete. Airlines thus provide onboard in-flight entertainment and communications (IFEC) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected. Inputs to the terminal unit may be provided via a separate multi-function remote controller or by via a combination touch display. Although the terminal unit and display device were separate components in earlier IFEC implementations, more recently, these components and more may be integrated into a single smart monitor.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. This data may be stored on a central content server, with each terminal unit including networking modalities such as Ethernet to establish a data communications link to the central content server. Following retrieval, the multimedia content data is decoded and presented on the display device.

Modern IFEC systems are thus comprised of multiple tiers of interconnected systems, including one or more IFEC head end servers, intermediary network switches, and each of the individual smart monitors for all of the passenger seats of the aircraft. Each of these components have specific software applications loaded thereon performing a variety of functions. For instance, the head end may include a multimedia streaming server application, while the smart monitor may include a streaming client application that communicates with the head end/streaming server application to retrieve specific multimedia content. The smart monitor may incorporate a menu application allowing the user to navigate through the available selection of multimedia content, as well as the aforementioned game, mapping, and other informational applications. Some of these client-side applications may utilize data provided by the IFEC head end server, such as destination weather and airport terminal information and the like. Accordingly, there may be a corresponding sever application on the head end server that responds to requests for such data.

Before deploying an IFEC system to a particular aircraft, or a fleet of aircraft, extensive testing is conducted to ensure that all of the components thereof are operational and function without fault or errors. Currently, such testing is performed by configuring a close physical facsimile of the actual vehicle installation, including a replicated IFEC head end server, the specific networking devices, and the smart monitors, including all of its hardware components as well as the wiring as would be implemented in the vehicle installation. The software is then tested on the replicated hardware. For large installations, such a testing platform is understood to represent a significant infrastructure investment in terms of equipment, as well as the facilities/real estate to accommodate the same. Additionally, testing may involve extended uptimes, so power consumption of the facility may be increased. There may be increased staffing costs to configure, deploy, the testing platforms, deploy, the testing platforms.

To the extent carriers utilize different IFEC configurations for different types of aircraft in its fleet, a separate testing platform may be needed for each. The time needed to reconfigure the testing platform for different vehicle configurations may delay deployment, which may become unacceptable. System vendors with multiple customers acutely experience these limitations as different customer IFEC installations must be quickly replicated on the testing platform. Even a single update to a component utilized across multiple customer installations may become problematic to test because of the delays involved with changing the testing platform configuration.

Accordingly, there is a need in the art for an improved testing and verification platform for IFEC installations that closely replicate the physical hardware environment. There is also a need in the art for the virtualization of complex network embedded systems for testing and verification. Furthermore, a testing platform for IFEC system software updates that can be instantiated faster and be scaled to accommodate any number of variations in hardware configurations would be desirable.

BRIEF SUMMARY

The present disclosure contemplates various embodiments of a virtual private cloud for the testing and verification of in-flight entertainment and communications systems. Predefined configurations as well as real-time, actual configuration data, or combinations thereof may be utilized to instantiate virtual machines comprising the virtual private cloud. Furthermore, the virtual private cloud may be adapted to discover and capture real-time configurations automatically during operation of the aircraft, and is readily reconfigurable to emulate different IFEC configurations of multiple aircraft. Thus, the rapid deployment and testing of existing and modified IFEC software is possible, leading to substantial reduction in costs otherwise associated with setting up test racks.

According to one embodiment of the present disclosure, a virtualization system for a vehicle-embedded system with a plurality of networked computing resources is disclosed. There may be a plurality of virtual machine images each including a hardware abstraction layer with simulated hardware component definitions corresponding to physical hardware components of specific ones of the plurality of networked computing resources. There may also be one or more virtual network connections between the virtual machine images. The virtual network connections may correspond to physical network links of the plurality of networked computing resources. The virtualization system may also include one or more virtual output displays connected to a corresponding one or more of the plurality of virtual machine images. Outputs generated by the respective virtual machine images in response to processing commands issued thereto may be displayed on the connected one of the one or more virtual output displays. There may also be a system supervisor that instantiates each of the virtual machine images and regulate the execution thereof. The system supervisor may further link the plurality of virtual machine images over the respective one of the virtual network connections. The virtualization platform may also include a testing and verification platform that cooperates with the system supervisor to deploy test software to one or more of the plurality of virtual machine images for execution thereon.

Another embodiment of the present disclosure may be a method for virtualizing a testing and verification platform of an in-flight entertainment and communications system. Such an IFEC system may include a plurality of networked computing resources. The method may begin with receiving simulated hardware component definitions corresponding to physical hardware components of the plurality of networked computing resources. This step may also include receiving network connection definitions corresponding to physical network links of the plurality of networked computing resources. There may also be a step of instantiating a plurality of virtual machine images. The virtual machine images may each include a hardware abstraction layer based upon the simulated hardware component definitions. Performance parameters of the virtual machine images may match performance parameters of the corresponding one of the plurality of networked computing resources. The method may further include establishing one or more virtual network connections between the virtual machine images. These virtual network connections may be based upon the network connection definitions. At least one of the one or more network connection definitions may be matched with network performance parameters of the corresponding one of the physical network links. There may also be a step of deploying one or more target software applications to one or more of the instantiated plurality of virtual machine images. Then, the method may include initiating the execution of the one or more target software applications on the respective virtual machine images, followed by a step of routing outputs from the execution of the one or more target software applications to corresponding one or more virtual output displays connected to the virtual machine images. The foregoing method may be embodied as one or more programs of instructions executable by a data processing device and stored in a non-transitory program storage medium readable by the same.

In another embodiment of the present disclosure, a testing and verification system for an equivalent physical configuration of an in-flight entertainment and communications system with one or more hardware components is provided. There may be a virtual machine manager, with one or more virtual machines each including a hardware abstraction layer being instantiated by the virtual machine manager. The instantiation of the virtual machines may be according to simulated hardware component definitions corresponding to the equivalent physical configuration of the hardware components of the in-flight entertainment and communications system. The one or more virtual machines may be in communication with another over virtual network connections established by the virtual machine manager. The testing and verification system may include a test interface to the one or more virtual machines that generate test inputs to one or more target software applications installed on the virtual machines and being executed thereby. There may also be a display interface that is connected to at least one of the one or more virtual machines. Results from the execution of the one or more target software applications responsive to the test inputs may be output to the display interface.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments directed to the virtualization of complex networked embedded systems for testing and verification in transportation vehicles. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
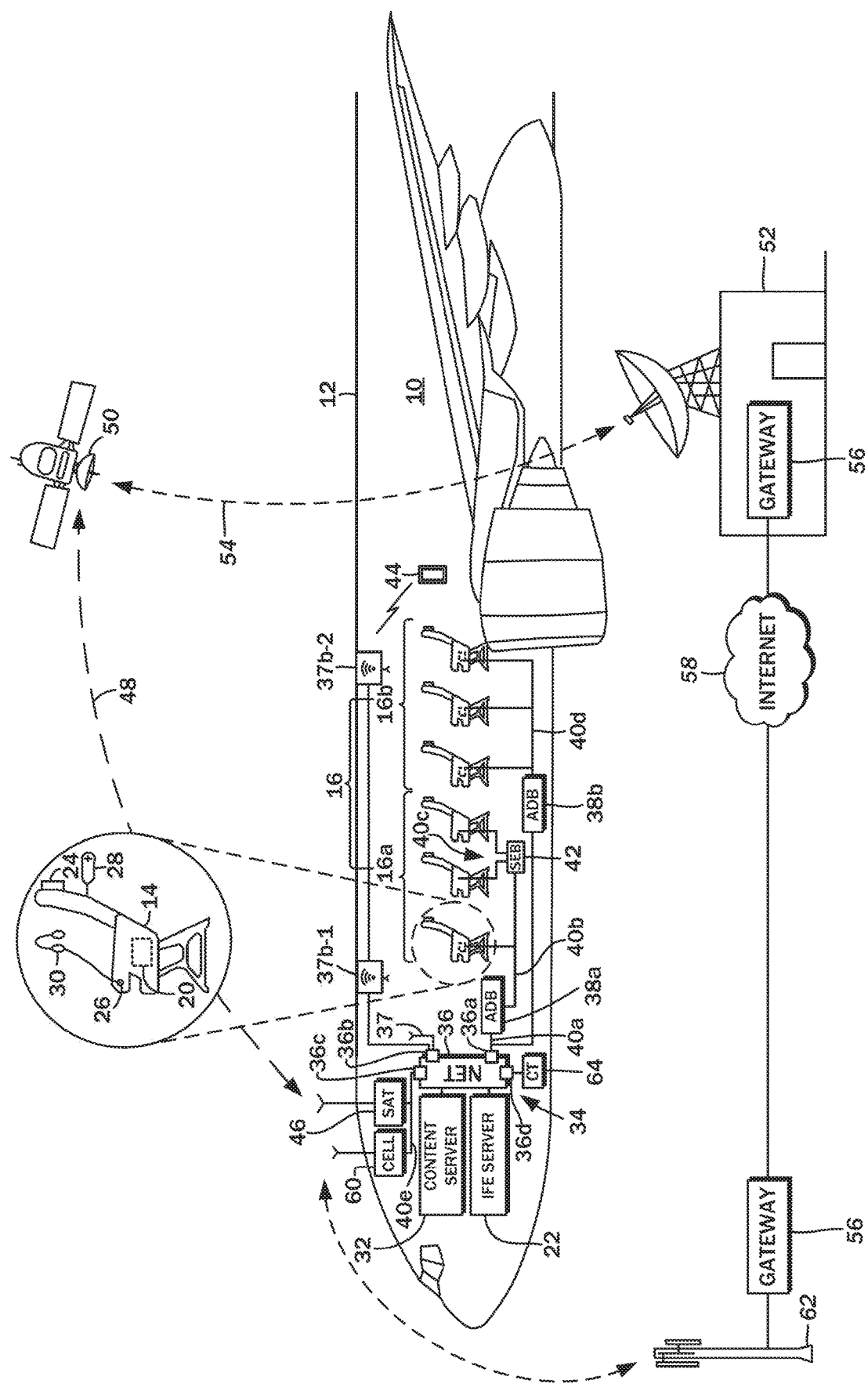
FIG. 1 is a diagram illustrating an exemplary aircraft in which an in-flight entertainment and communications system is installed.

FIG. 1 is a simplified diagram of an aircraft 10, generally referred to herein as a vehicle, along with select subsystems and components thereof that may be virtualized for testing and verification purposes in accordance with the embodiments of the present disclosure. Within a fuselage 12 of the aircraft 10, there may be seats 14 arranged over multiple rows 16, with each seat 14 accommodating a single passenger. Although the features of the present disclosure will be described in the context of the aircraft 10, this is by way of example only and not of limitation. The presently disclosed embodiments of the virtualization of complex networked embedded systems may be applicable to other contexts as appropriate, such as, by way of non-limiting illustrative example, busses, trains, ships, and other types of vehicles.

Installed in the aircraft 10 is an in-flight entertainment and communications (IFEC) system 18, through which various entertainment and connectivity services may be provided to passengers while onboard. When referenced generally, the IFEC system 18 is understood to encompass terminal devices 20 installed for each seat 14, as well as the IFEC server 22 and the other components involved in the delivery of the entertainment and communications functionality. In the illustrated example, this includes a display 24, an audio output 26, and a remote controller or handset 28. For a given row 16 of seats 14, the terminal device 20 and the audio output 26 are disposed on the seat 14 for which it is provided, but the display 24 and the handset 28 may be located on the row 16 in front of the seat 14 to which it is provided. That is, the display 24 and the handset 28 are installed on the seatback of the row in front of the seat. Other display 24 and handset 28 mounting and access configurations such as a retractable arm or the like mounted to an armrest of the seat 14 or by mounting on a bulkhead are also possible.

The display 24 is understood to be a conventional liquid crystal display (LCD) screen or other type with a low profile that is suitable for installation on the seatback. Each passenger can utilize an individual headset 30, supplied by either the airline or by the passenger, which provides a more private listening experience. The audio output 26 may be a headphone jack that is a standard ring/tip/sleeve socket. The headphone jack may be disposed in proximity to the display 24 or on the armrest of the seat 14 as shown. The headphone jack may be an active type with noise canceling and including two or three sockets or a standard audio output without noise canceling. Each display 24 may incorporate the aforementioned terminal device 20 to form a unit referred to in the art as a smart monitor.

A common use for the terminal device 20 installed on the aircraft 10 is the playback of various multimedia content. The terminal device 20 may be implemented with a general-purpose data processor that decodes the data files corresponding to the multimedia content and generates video and audio signals for the display 24 and the audio output 26, respectively. The multimedia content data files may be stored in one or more content servers 32, and streamed to specific terminal devices 20 upon request. The content may be encrypted, so the digital rights management functionality to enable streaming/playback may be performed by the IFEC server 22. Functionality not pertaining to the delivery of multimedia content, such as relaying imagery from external aircraft cameras, flight path/mapping information, and the like may also be performed by the IFEC server 22.

The passenger can play games being executed on the terminal device 20 and otherwise interact with the multimedia content with the handset 28. Navigating through the vast multimedia content library and selecting ones for viewing and/or listening is also possible with the handset 28, though in some different installations, a touch-screen display may be provided for a more intuitive interaction with the multimedia content library. In either case, the terminal device 20 is loaded with a content selection software application that is executed by the data processor and accepts input from the handset 28 or other input modality and generates a response on the graphical interface presented on the display 24.

Each of the terminal devices 20 for the seats 14 may be connected to the IFEC server 22, the content server 32, or any other server that is part of the IFEC system 18 over a local area network 34, one segment of which may preferably be Ethernet. The IFEC system 18 thus also includes a data communications module 36, and more specifically, an Ethernet data communications module 36a, e.g., an Ethernet switch or router. In a typical aircraft installation, the data communications module 36 is understood to be a separate line replaceable unit (LRU), and may also be referred to as a network controller (NC). Likewise, the IFEC server 22, the content server 32, and the other servers onboard the aircraft 10 are understood be standalone computer systems with one or more general purpose data processors, memory, secondary storage, and a network interface device for connecting to the local area network 34. The computer systems may have an operating system installed thereon, along with server applications (e.g., web servers, streaming servers, and so forth) providing various in-flight entertainment/communications services in cooperation with the terminal devices 20 connected thereto. In particular, there may be a cataloging/menu application with which the user interacts to select the desired multimedia content.

The local area network 34 may be logically separated into tiered segments, with the network controller/data communications module 36 being at the top of the hierarchy or central to all of the segments. The smart monitors/terminal devices 20 may be organized according to sections, rows, or columns of seats 14, and the local area network 34 may be structured accordingly.

There may be a first area distribution box (ADB) 38a, which may also be a line replaceable unit that is directly connected to the network controller/data communications module 36 and establishes a segment of the local area network 34 for a first set of rows 16a. By way of example, this network segment 40a may be implemented with a 10 gigabit per second speed physical/data link. The cabling utilized to for the network segment 40a may be fiber optic. Connected to the first ADB 38a over a downstream network segment 40b may be the smart monitors/terminal device 20. The speed of the network segment 40b may be slower than the upstream network segment 40a, and may be implemented with a 2.5 gigabit per second speed physical/data link. In some implementations, there may be an additional seat electronic box (SEB) 42 that handles some data processing operations shared amongst multiple smart monitors.

The further downstream network segments 40c may be implemented with a 1 gigabit per second speed physical/data link. This network segment 40c may, in turn, be shared with the peripheral devices connected to the smart monitor such as a credit card reader on the handset 28, a USB port, and the like.

A second ADB 38b is also directly connected to the network controller/data communications module 36, and is also part of the same network segment 40a having a 10 gigabit per second speed physical/data link. The second ADB 38b is understood to be dedicated for the second set of rows 16b, with individual connections to each of the smart monitors/terminal devices 20 defining a network segment 40d. Although different network segmentation hierarchies are illustrated, for example, one set of seats 14 being connected to an SEB 42, which in turn is connected to the ADB 38a, along with a direct connection between the smart monitor/terminal device 20 to the ADB 38b, a typical aircraft configuration will be consistently structured.

Passengers and cabin crew alike may utilize a portable electronic device (PED) 44 during flight. PEDs 44 are understood to refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Conventional PEDs 44 are understood to incorporate a WLAN (WiFi) module, so the data communications module 36 of the IFEC system 18 includes a WLAN access point 37 that is connected over a local wireless network interface 36b. The PED 44, via the onboard WLAN network, may connect to the IFEC 18 to access various services offered thereon such as content downloading/viewing, shopping, and so forth. Typically, a single WLAN access point 37 is insufficient for providing wireless connectivity throughout the cabin, so additional WLAN access points 37b-1, and 37b-2 may be installed at various locations spaced apart from each other. These additional WLAN access points 37b-1 and 37b-2 may be connected to the network controller/data communications module 36 over an Ethernet link that is part of the aforementioned local area network 34. The local area network interface or data communications module 36 is understood to encompass the hardware components such as the WLAN transceiver, antennas, and related circuitry, the Ethernet router/switch, as well as the software drivers that interface the hardware components to the other software modules of the IFEC system 18.

Due to the speed/bandwidth limitations associated with current implementations of WiFi and other wireless data networking modalities, the communications between each of the terminal devices 20 and the IFEC server 22, content server 32, and other servers is understood to be over the wired local area network 34. However, it will be appreciated that this is by way of example only and not of limitation. Future wireless networking modalities may bring substantial improvements in transfer speed and available bandwidth such that all of the terminal devices 20 are connected wireless. Indeed, this would be desirable because in the weight-restricted context of aircraft installations, the elimination of cables and associated switch/router interfaces would improve aircraft operational efficiency. In this regard, the alternative WiFi data communications module 36b is being presented to illustrate the possibility of utilizing other data networking modalities beyond the wired local area network 34.

The IFEC system 18, including each of its constituent components, as well as the other avionics systems and the PEDs 44 onboard the aircraft 10 may communicate with remote nodes via a variety of communications modalities. The network controller/data communications module 36 thus includes a remote module 36c that is connected to, for example, a satellite module 46. The satellite module 46 establishes a data uplink 48 to a communications satellite 50. The data uplink 48 may be Ku-band microwave transmissions. However, any suitable communications satellite 50, such as Inmarsat or Iridium may also be utilized. The data transmitted to the communications satellite 50 is relayed to a satellite communications ground station 52. A data downlink 54 is established between the communications satellite 50 and the satellite communications ground station 52. A network gateway 56 at the satellite communications ground station 52 may then routes the transmission to the Internet 58 or other network. Due to the high costs associated with the communications satellite 50, carriers may limit data traffic to and from the satellite module 46 with a firewall or network access controller.

Alternatively, or additionally, the the IFEC system 18 may incorporate a cellular modem 60 for remote connectivity, which similarly establishes a communications link via terrestrial cellular sites 62. This remote connectivity modality is understood to be primarily utilized while the aircraft 10 is on the ground, and utilizes a cellular communications provider that offers a network gateway 56 routing data traffic from the cellular modem 60 to the Internet 58 or other wide area network. The cellular modem 60 may serve as a backup to the extent a local airport-based WiFi network is unavailable.

The satellite module 46 and the cellular modem 60 may be on still a different part of the local area network 34, e.g., a fifth network segment 40e that may be implemented with a 10 gigabits per second physical/data link. As indicated above, to limit incoming as well as outgoing traffic, this network segment 50e may incorporate a network access controller to paying users, crew members, or other subgroups of those accessing the local area network 34 onboard the aircraft 10.

The network controller/data communications module 36 includes an additional local network interface 36d for connecting other avionics thereto. One such device may be a crew terminal 64 utilized by the ground crew, cabin crew, or the flight crew to access IFEC maintenance functions such as loading new content, replenishing multimedia content digital rights management (DRM) keys, and so on. Additional interfaces to the network controller/data communications module 36 beyond those described above may also be incorporated.

The foregoing arrangement of the IFEC system 18, along with its constituent components, have been presented by way of example only and not of limitation. Other aircraft 10 may have any number of different configurations, and may incorporated components that were not mentioned above, or functions may be handled by a different subpart or component than that to which above description attributes. Along these lines, features described above may be omitted from such different configurations.

The embodiments of the present disclosure are contemplated to virtualize each component of the IFEC system 18 for testing and verification purposes so that a replica hardware setup can be avoided. It is further contemplated that different configurations of the IFEC system 18 installed in other aircraft 10 may also be virtualized and stood up expeditiously. Thus, testing and verification can be completed without the delays associated with configuring a physical replica of the IFEC system 18.

Figure 2:
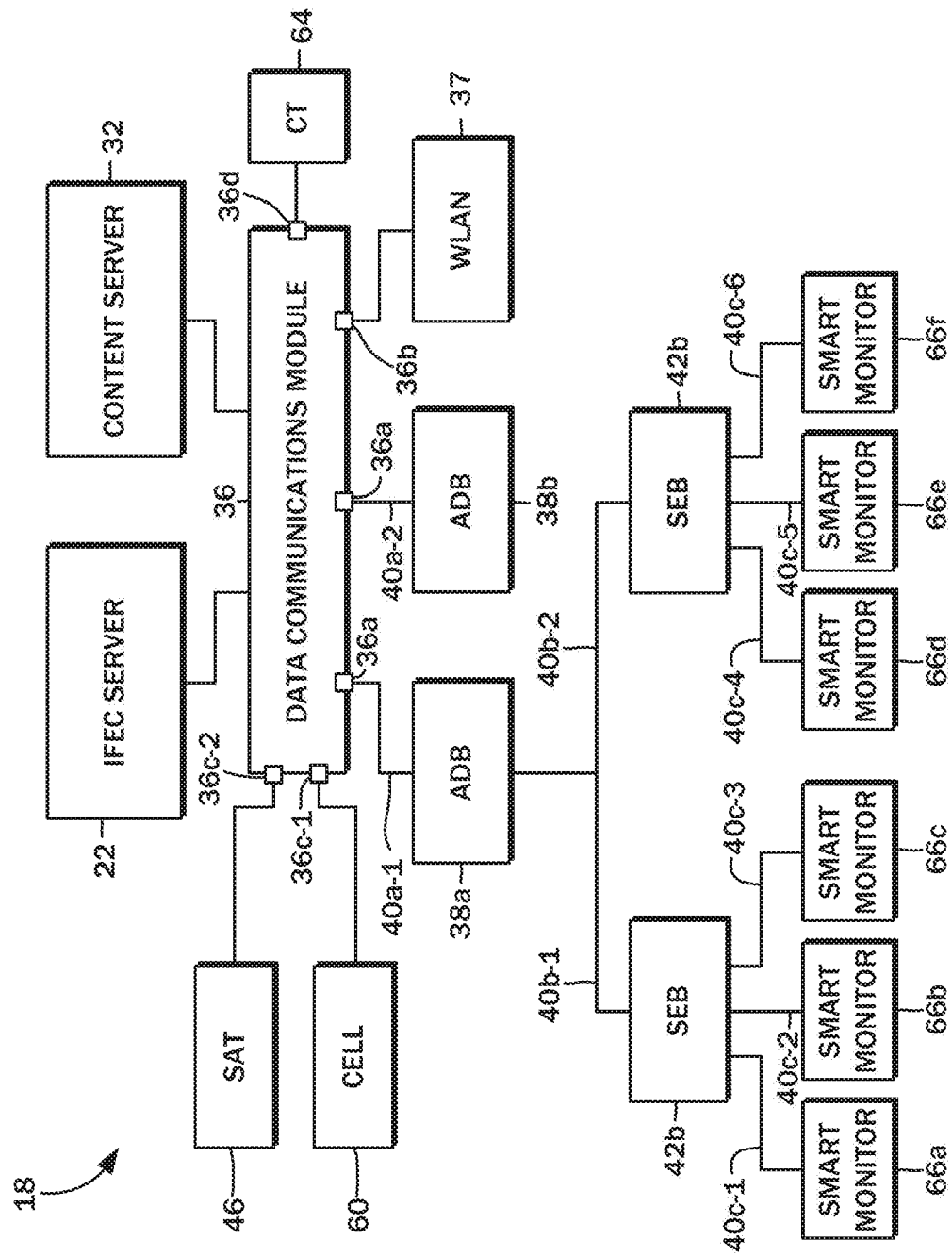
FIG. 2 is a block diagram of an exemplary network of computer resources corresponding to the in-flight entertainment and communications system.

Referring now to the block diagram of FIG. 2, the foregoing components of the IFEC system 18 such as the smart monitor/terminal device 20, the IFEC server 22, the content server 32, and so forth may be generally described as networked computing resources. As discussed above, these networked computing resources may be implemented with a general-purpose computer with a processor, memory, secondary storage, a data network interface, and one or more input/output interfaces. According to various embodiments of the present disclosure these hardware components of the computer may be virtualized, and the software applications that are otherwise executed on such networked computing resources can also be executed on the virtualized counterpart.

As described in detail above, central to the IFEC system 18 is the data communications module 36 or network controller that interconnects all of the networking computing resources together, either directly or indirectly through various intermediary network devices. Generally, the smart monitor/terminal device 20 are understood to be the clients to the servers (IFEC server 22, content server 32, etc.). A first interface of the network controller, that is, the ethernet data communications module 36a, is connected to the first area distribution box 38a over a first network segment 40a-1. Similarly, a second interface of the network controller that is also the ethernet data communications module 36a but may be, for example, a second port thereof, is connected to the second area distribution box 38b over a second network segment 40a-2. The ADBs 38, as discussed above, are understood to be network switches that route data traffic to and from the data communications module 36, and so no data processing functions may need to be virtualized therefor.

The first ADB 38a is connected to one or more SEBs 42, including the first SEB 42a and the second SEB 42b over a network segment 40b-1 and a network segment 40b-2, respectively. The first SEB 42a interfaces with a first smart monitor 66a, a second smart monitor 66b, and a third smart monitor 66c, which may be the terminal devices for a given row of seats. In addition to routing the data traffic to and from the ADB 38, the SEB 42 may perform certain data processing functions prior to outputting the results of that operation to one or more of the smart monitors 66. Each of the smart monitors 66 is understood to utilize a different network segment 40c-1, 40c-2, and 40c-3. The second SEB 42b may likewise interface with a different set of smart monitors 66, including a fourth smart monitor 66d, a fifth smart monitor 66e, and a sixth smart monitor 66f, over respective network segments 40c-4, 40c-5, and 40c-6. Again, independent of the ADBs 38 and downstream smart monitors 66 connected thereto, the crew terminal 64 is connected to the data communications module 36 via the local network interface 36d.

Also as described above, the data communications module 36 includes a local wireless network interface 36b connected to the WLAN access point 37, as well as remote modules 36c including a first remote module 36c-1 that interfaces with the satellite module 46, and a second remote module 36c-2 that interfaces with the cellular modem 60. These components are likewise understood to be network devices that perform minimal, if any, processing of the incoming data, whether transmitted from the data communications module 36 to a downstream networked computing resource, or from the networked computing resource to the data communications module 36. Accordingly, these components need not be virtualized, though the particulars of the network segments 40 may be virtualized to more accurately reflect its performance for simulating the functionality of components relying thereon.

Figure 3:
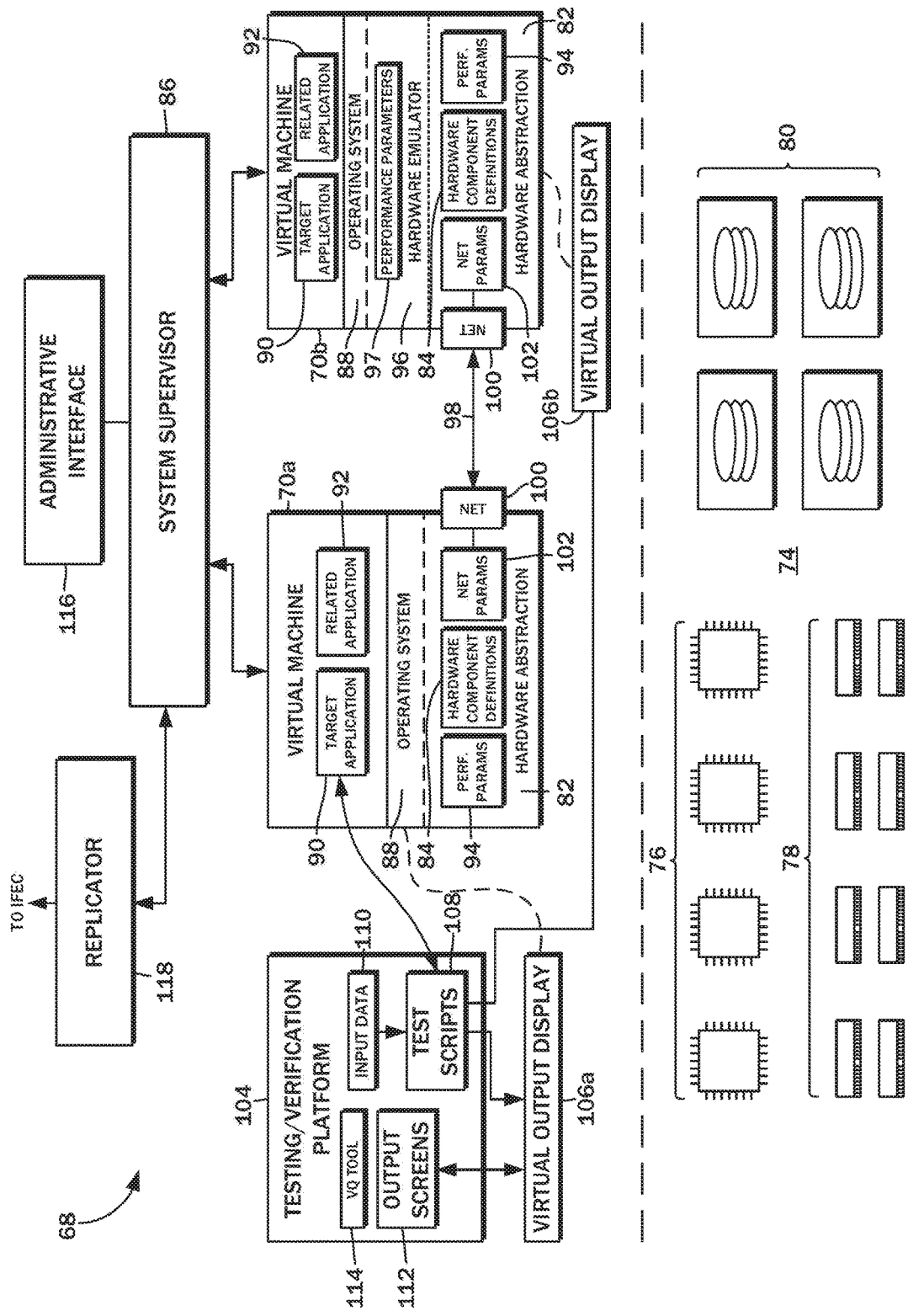
FIG. 3 is a block diagram a virtualization system according to one embodiment of the present disclosure.

Referring now to the block diagram of FIG. 3, various embodiments of the present disclosure are directed to a virtualization system 68 for a vehicle-embedded system such as the IFEC system 18, which, as explained above, includes a plurality of networked computing resources like the IFEC server 22, the content server 32, and the smart monitors 66. The virtualization system 68 may include a plurality of virtual machine images 70, and in the illustrated example, there is a first virtual machine image 70a and a second virtual machine image 70b. Although only two virtual machine images 70 are depicted, it is to be understood that a separate virtual machine image is instantiated for each of the networked computer resources of the IFEC system 18. These virtual replicas are envisioned to be combined and interconnected to define a virtual test cloud rack, rather than a physical test rack of the hardware components making up the IFEC system 18.

According to one embodiment, underlying the virtualization system 68 is a cloud computing platform 74 comprised of an array of data processors 76, memory 78 utilized thereby, and secondary data storage devices 80. The cloud computing platform 74 utilized may be Amazon Web Services (AWS) from Amazon.com, Inc. of Seattle, Wash., though this is by way of example only and not of limitation. Other cloud computing platforms such as Azure from Microsoft Corporation of Redmond, Wash., or any others having the same or similar functionality and features as utilized by the virtualization system 68 may be readily substituted without departing from the scope of the present disclosure. To the extent such a third party cloud computing platform 74 is utilized, the specific configuration and arrangement of the data processors 76, memory 78, secondary data storage devices 80, and other components are abstracted from the implementation of the virtualization system 68. Thus, no additional details of the cloud computing platform 74 will be described.

Generally, the cloud computing platform 74 permits the instantiation of virtual machines. Performance of such virtual machines may be explicitly set based on various configuration options, and this functionality is utilized in the embodiments of the present disclosure to instantiate virtual machines that match, or as closely as possible match the performance of the physical counterparts of the networked computer resources of the IFEC system 18. As further detailed in FIG. 3, each virtual machine image 70 includes a hardware abstraction layer that simulates the central processing unit type, central processing unit speed, available memory (RAM) and total capacity, speed of the secondary storage drives, capacity, and so forth of the corresponding networked computing resource being virtualized. These details may be stored as simulated hardware component definitions 84 that it used by a system supervisor 86 to instantiate the virtual machine.

In view of the virtual machine simulating a counterpart networked computing resource, the same operating system 88 as that of the physical counterpart is installed thereon. Thus, from the operating system 88 upwards, including the test target application 90 as well as any companion software applications 92 cooperating with the test target application 90, it appears as though the hardware being utilized is that of the virtualized networked computing resource, rather than the specific hardware of the cloud computing platform 74.

The speed and other capabilities of the individual virtualized hardware components may be limited according to performance parameters 94 that likewise match those of the counterpart networked computing resource that is being virtualized. The performance parameters 94 may define system capabilities such as video decoding/encoding support, encryption acceleration, and remote director memory access to and from a secondary storage drive.

The simulated hardware component definitions 84 and the performance parameters 94 are utilized by the system supervisor 86 to regulate/throttle the execution of all software above the operating system level on each of the virtual machines to match those of the corresponding networked computing resource of the IFEC system 18. In the embodiment utilizing the Amazon Web Services cloud computing platform 74, the underlying processor architecture is understood to be the Intel 64 bit CISC (Complex Instruction Set Computing) architecture, and so virtualization of networked computing resources such as the IFEC server 22 and the content server 32 with the same architecture is possible without further configuration changes. However, in some embodiments, the smart monitor 66 utilizes an ARM (Advanced Reduced Instruction Set Computing Machine) architecture, a hardware emulator 96 may be installed above the hardware abstraction layer 82. The same ARM-based operating system may then be installed, with all instructions being translated from one architecture to another at the machine level. The performance of the hardware emulator 96 may also be governed by a set of performance parameters 97 that match those of the corresponding hardware of the networked computing resource.

The system supervisor 86 thus instantiates the virtual machines based upon the images thereof and the various configuration data associated with the images. In addition to instantiating the virtual machines themselves, the system supervisor 86 may also link multiple virtual machines over one or more virtual network connections 98. Each of the virtual machines may include a virtual network interface 100 that similarly correspond to the physical counterparts of the networked computing resources of the IFEC system 18, including physical wire type, network speed, bandwidth, error rates, and so forth. The specifics of the virtual network interface 100 and the virtual network connections 98 established thereby are provided in a network parameter set 102, which are utilized by the system supervisor 86.

Referring back to FIG. 2, in an exemplary configuration, the system supervisor may instantiate a first virtual machine corresponding to the IFEC server 22, and a first smart monitor 66*a*. In the physical IFEC installation, the IFEC server 22 is connected to the data communications module 36, which in turn is connected to the first ADB 38*a* over the network segment 40*a*-1. Connected downstream to the first ADB 38*a* via the network segment 40*b*-1 is the first SEB 42*a*, which in turn is connected to the first smart monitor 68*a* over the network segment 40*c*-1. Thus, a connection between the IFEC server 22 and the first smart monitor 66*a* traverses the network segments 40*a*-1, 40*b*-1, and 40*c*-2, including another virtual machine instantiated for the first SEB 42*a*. These network segments 40, along with the specific performance characteristics thereof, are defined in the network parameter set 102. The other virtual networks between the various virtual machines are understood to be similarly defined according to the embodiments of the present disclosure.

When testing and verifying the test target applications, functionalities relying on the particular configuration of the network computing resources and/or the network connections may be enforced to simulate real-word operational conditions. This may aid in the discovery of programming errors and the like that may be masked when executed on faster or more capable computer systems than what is available in the context of the TEC system 18. In this regard, various embodiments of the present disclosure contemplate a testing/verification platform 104 running within the virtualization system 68.

Configured either together or independently of the testing/verification platform 104 is a virtual output display 106, of which there may be a first one 106*a* for the first virtual machine image 70*a*, and a second one 106*b* for the second virtual machine image 70*b*. However, depending on the specific testing needs, a single virtual output display 106 may be instantiated for both the first virtual machine image 70*a* and the second virtual machine image 70*b*.

In general terms, the outputs that are generated by the virtual machines in response to processing commands are displayed on the virtual output displays 106. It is also contemplated for the testing/verification platform 104 to run a series of test scripts 108 using input data 110 against the test target application 90. The input data 110 may be time-varying data that is selectable at the time of running the test, and may be fixed data that would be generated during the course of a typical flight, random passenger inputs, and so forth. A test engineer need not visually inspect each of the display outputs from the virtual output displays 106 across the entirety of the virtualization system 68, but an expected screen state 112 may be defined for specific application execution points. The output from the virtual output displays 106 may be compared to those expected screen states 112, and an alert may be generated to the extent any screen does not match the same.

The stability of video decoding on the smart monitor 66 may also be tested in various ways. One possibility is to analyze a video buffer state, in which an overflow or underflow condition can be detected by the testing/verification platform 104 and another alarm may be generated in response to such conditions. The video output from the virtual output displays 106 for each virtual machine may be fed to an automated video quality measuring tool 114. The specifications for video quality may be defined in the Airline Passenger Experience Association (APEX) 0415 specification, section 9.3.

The entirety of the configuration data for a given virtual machine image 70 may be stored, retrieved, copied, etc. to instantiate in the same or other virtual clouds. Thus, a virtual IFEC testing and verification environment can be created for each specific IFEC configuration in different aircraft 10. The extensive delays that would otherwise be attendant to setting up a physical test rack of each networked computing resource of the IFEC system 18 may be avoided. Furthermore, the automated tests may be run upon instantiation with minimal to no user intervention, and additional test scripts and results checkers may be utilized to raise alarms to the extent any error conditions are detected.

The configuration options of the virtual machines images 70, the system supervisor 86, and the testing/verification platform 104 may be defined via an administrative interface 116. When accessed by a developer of the test target application 90, the simulated hardware component definitions 84, the performance parameters 94, and the network parameter sets 102 of each virtual machine image 70 may be restricted from being modified, and permit the execution of the test scripts 108.

Beyond automating the testing procedures of the test target application 90, automating the configuration of the virtualization system 68 is expressly contemplated. More particularly, such embodiments may include a computing resource replicator 118 that is in communication with the networked computing resources of the IFEC system 18 to derive the simulated hardware component definitions 84, the performance parameters 94, and the network parameter sets 102. This communication may be either direct or indirect, that is, either direct communications from the aircraft to the ground-based computing resource replicator 118, or indirect communications via the onboard IFEC system 18 and transferring the relevant parameters in a file to the replicator 118. This transfer may take place over a delayed communications modality, physical transfer of media, or any other suitable transfer. Furthermore, the networked computing resources of the IFEC system 18 are understood to be real or actual ones as are, or would be, installed within an operating aircraft. A counterpart reporter module may be incorporated into the IFEC system 18 to gather and report discovered system configuration data, including the aforementioned wiring configuration, LRU configurations, installed software parts, along with the performance data associated therewith.

With the same modality, a baseline or normal processor load, memory usage, and secondary storage drive usage, as well as network error rates may be retrieved for a given IFEC system 18. This data can be used to instantiate the virtual counterpart thereof, and better replicate as-installed and in-service performance measurements when simulating the IFEC system 18 with the virtualization system 68. Such features are contemplated to reducing the occurrence of issues that may arise only in the context of an actual vehicle installation rather than on a test rack.

Along these lines, the input data 110 passed to the test target applications 90 may similarly be retrieved from a live IFEC system 18 via the computing resource replicator 118 that is in communication with the counterpart reporter module. This input data 110 may be captured from specific in-service systems and offloaded for a test engineer to replicate the specific conditions under which an error may have occurred during a flight. For example, it is possible to select data from "flight XY123 on date A/B/C from AAA to BBB," and all aircraft input data 110 to the virtualization system 68 may be exactly as captured from such flight. To the extent a network connection is available between the operating aircraft 10 and the ground-based cloud computing platform 74, the aforementioned configuration and input data may be retrieved in real-time and applied to the configuration of the virtualization system 68.

The testing/verification platform 104 may also utilized for security testing, which may take the form of another virtual machine image 70. A vulnerability scanner along the lines of the test scripts 108 may be loaded thereon and executed, which scans the virtual machine images 70 for known or new security vulnerabilities. A virtual terminal may also be included to provide a security penetration tester access to one of the virtual output displays 106, an I/O port, or other components for performing further security testing.

Figure 4:
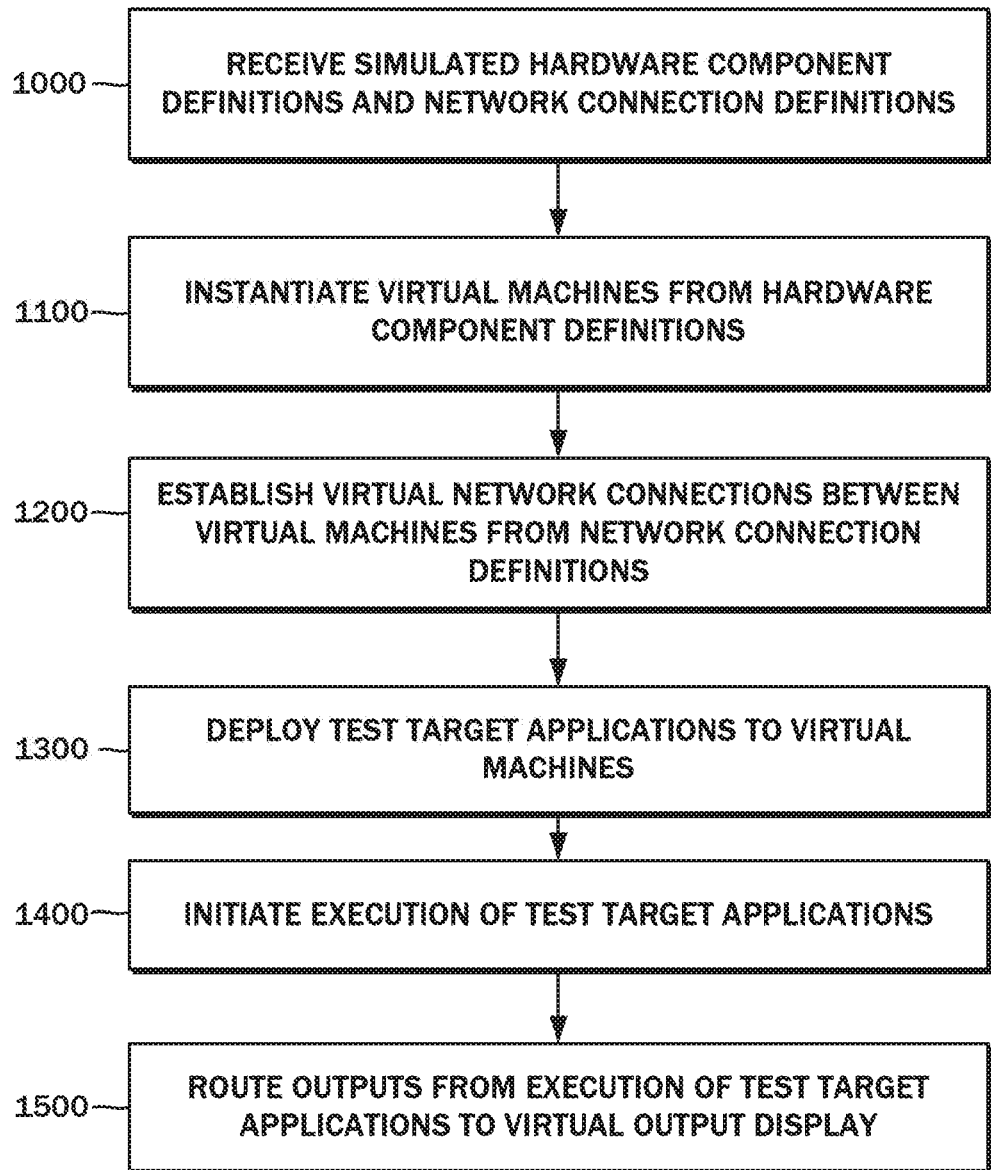
FIG. 4 is a flowchart of one embodiment of a method for virtualizing a testing and verification platform for the in-flight entertainment and communications system.

In addition to the virtualization system 68 described above, another embodiment of the present disclosure contemplates a method for virtualizing a testing and verification platform for the IFEC system 18. With reference to the flowchart of FIG. 4, the method may begin with a step 1000 of receiving the simulated hardware component definitions 84 that correspond to the physical hardware components of the networked computing resources of the IFEC system 18. This step is also understood to encompass receiving the network connection definitions/network parameter sets 102 that correspond to the physical and data network links of the networked computing resources of the IFEC system 18. The modalities by which this may be achieved have been described above, including retrieval from a physical installation, and inputting such configuration settings via the administrative interface 116 of the virtualization system 68.

The method then continues with a step 1100 of instantiating a plurality of the virtual machine images 70. As discussed above, these virtual machine images 70 include the hardware abstraction layer 82, the performance and behavior of which are governed by the received simulated hardware component definitions 84. The performance parameters of the virtual machine images 70 are understood to match the performance parameters of the networked computing resources.

Along these lines, the method includes a step 1200 of establishing one or more virtual network connections 98 between the virtual machine images 70. Such virtual network connections 98 are understood to match the network performance parameters of the corresponding physical network links in the IFEC system 18. Thereafter, the method may continue with a step 1300 of deploying one or more of the test target applications 90 to the virtual machines. Testing may commence by instantiating the execution of such test target applications 90 in a step 1400. This step may be performed by the testing/verification platform 104. Next, in a step 1500, the output from the execution of the test target applications 90 may be routed to the virtual output display 106. Thus, in accordance with the foregoing method, virtual machines can be instantiated in addition to the virtual network connections between the virtual machines, and testing and verification may be performed on various test target applications running thereon. Updates and fixes can be rapidly tested and subsequently deployed to production IFEC systems 18 with substantially reduced delays and cost.

The particulars shown herein are by way of example only for purposes of illustrative discussion and are presented in the cause of providing what is believed to be the most useful and readily understood description of the principles and conceptual aspects of the various embodiments of the virtualization of complex networked embedded systems for testing and verification in transportation vehicles as set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A virtualization system for a vehicle-embedded system with a plurality of networked computing resources, the virtualization system comprising:

a plurality of virtual machine images each including a hardware abstraction layer with simulated hardware component definitions corresponding to physical hardware components of specific ones of the plurality of networked computing resources included in an in-flight entertainment and communications system provided in a passenger vehicle;

one or more virtual network connections between the virtual machine images, the virtual network connections corresponding to physical network links of the plurality of networked computing resources;

one or more virtual output displays connected to a corresponding one or more of the plurality of virtual machine images, outputs generated by the respective virtual machine images in response to processing commands issued thereto being displayed on the connected one of the one or more virtual output displays;

a system supervisor instantiating each of the virtual machine images and regulating the execution thereof, the system supervisor linking the plurality of virtual machine images over the respective one of the virtual network connections; and a testing and verification platform cooperating with the system supervisor to deploy test software to one or more of the plurality of virtual machine images for execution thereon.

2. The virtualization system of claim 1, wherein the simulated hardware component definitions are selected from a group consisting of: a central processing unit type, central processing unit speed, random access memory capacity, secondary storage drive speed, secondary storage drive capacity.

3. The virtualization system of claim 2, wherein a performance parameter of the virtual machine images matches a performance parameter of the corresponding one of the plurality of networked computing resources.

4. The virtualization system of claim 3, wherein the performance parameter is selected from a group consisting of: video decoding support, video encoding support, encryption acceleration, and remote direct memory access to and from a secondary storage drive.

5. The virtualization system of claim 1, wherein the virtual network connections are defined by one or more network connection definitions selected from a group consisting of: network speed, network type, and network error rates.

6. The virtualization system of claim 5, wherein at least one of the one or more network connection definitions are matched with network performance parameters of the corresponding one of the physical network links.

7. The virtualization system of claim 1, wherein each of the virtual machine images includes an operating system loaded thereon matching an operating system loaded on the corresponding one of the plurality of networked computing resources.

8. The virtualization system of claim 1, further comprising a hardware emulator for a first processor architecture installed in one of the plurality of virtual machine images being executed on a computer system of a second processor architecture different from the first processor architecture.

9. The virtualization system of claim 1, further comprising a computing resource replicator in direct or indirect communication with the plurality of real networked computing resources to derive the simulated hardware component definitions therefrom, the computing resource replicator instantiating at least one of the plurality of virtual machine images based upon the derived simulated hardware component definitions.

10. The virtualization system of claim 9, wherein the computing resource replicator derives the virtual network connections corresponding to the physical network links of the plurality of networking computing resources.

11. The virtualization system of claim 9, wherein the computing resource replicator derives the simulated hardware component definitions in real-time while the plurality of networked computing resources is in operation.

12. A testing and verification system for an equivalent physical configuration of an in-flight entertainment and communications system with one or more hardware components, the system comprising:

a virtual machine manager, one or more virtual machines each including a hardware abstraction layer being instantiated by the virtual machine manager according to simulated hardware component definitions corresponding to the equivalent physical configuration of the hardware components of the in-flight entertainment and communications system provided in a passenger vehicle, the one or more virtual machines being in communication with another over virtual network connections established by the virtual machine manager;

a test interface to the one or more virtual machines that generate test inputs to one or more target software applications installed on the virtual machines and being executed thereby; and a display interface connected to at least one of the one or more virtual machines, results from the execution of the one or more target software applications responsive to the test inputs being output to the display interface.

13. The testing and verification system of claim 12, further comprising a computing resource replicator in communication with the in-flight entertainment and communications system deployed to the aircraft to derive the simulated hardware component definitions therefrom.

14. The testing and verification system of claim 13, wherein the simulated hardware component definitions are based upon performance data recorded by the in-flight entertainment and communications system.

* * * * *